(12) United States Patent
Belew et al.

(10) Patent No.: US 12,056,969 B2
(45) Date of Patent: *Aug. 6, 2024

(54) COMMUNICATION PROTOCOL FOR NON-INTERNET-ENABLED DEVICES

(71) Applicant: Luxer Corporation, McClellan, CA (US)

(72) Inventors: Doug Belew, Davis, CA (US); David O'Riva, Loomis, CA (US); Dardo Sordi Bogado, Macia (AR)

(73) Assignee: Luxer Corporation, McClellan, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/511,876

(22) Filed: Oct. 27, 2021

(65) Prior Publication Data

US 2022/0400111 A1    Dec. 15, 2022

Related U.S. Application Data

(60) Provisional application No. 63/208,562, filed on Jun. 9, 2021.

(51) Int. Cl.
*G07C 9/00* (2020.01)
*H04L 9/40* (2022.01)

(52) U.S. Cl.
CPC ..... *G07C 9/00309* (2013.01); *G07C 9/00912* (2013.01); *H04L 63/0428* (2013.01);
(Continued)

(58) Field of Classification Search
CPC .... H04L 63/0428; H04L 63/061; H04L 63/10
(Continued)

(56) References Cited

U.S. PATENT DOCUMENTS 8,482,378 B2  7/2013  Sadighi et al.
8,819,792 B2  8/2014  Adams
(Continued)

FOREIGN PATENT DOCUMENTS

CN    109155096 A    1/2019
EP    3 410 410 A1   12/2018
(Continued)

OTHER PUBLICATIONS

Belew et al., Communication Protocol for Non-Internet-Enabled Devices. Co-pending U.S. Appl. No. 17/511,865, filed Oct. 27, 2021.
(Continued)

*Primary Examiner* — Teshome Hailu
(74) *Attorney, Agent, or Firm* — Wolf, Greenfield & Sacks, P.C.

(57) ABSTRACT

A method of updating a first device (e.g., one or more locking devices) to reflect information located on a second device (e.g., a server) is provided, where the first device and the second device cannot communicate directly with one another. The method may include employing a third untrusted device (e.g., a mobile device) temporarily as an intermediary between the first device and second device. The method may include receiving, at the first device and from a third device, a request for the first device to communicate with the third device. In response to determining that the third device is authorized to communicate with the first device, the first device may receive information from the third device that was provided by the second device. The first device may transmit at least one message to the third device that is to be provided to second device.

30 Claims, 7 Drawing Sheets

(52) U.S. Cl.
CPC ............ *H04L 63/061* (2013.01); *H04L 63/10* (2013.01); *G07C 2009/00412* (2013.01); *G07C 2009/00769* (2013.01)

(58) Field of Classification Search
USPC .......................................................... 726/4
See application file for complete search history.

(56) References Cited

U.S. PATENT DOCUMENTS

| | | |
|---|---|---|
| 8,922,333 B1 | 12/2014 | Kirkjan |
| 8,966,651 B2 | 2/2015 | McConnell et al. |
| 9,024,720 B2 | 5/2015 | Bliding et al. |
| 9,077,716 B2 | 7/2015 | Myers et al. |
| 9,406,180 B2 | 8/2016 | Eberwine et al. |
| 9,460,480 B2 | 10/2016 | Woodard et al. |
| 9,858,736 B2 | 1/2018 | Tseng et al. |
| 10,096,183 B2 | 10/2018 | Nitu et al. |
| 10,102,699 B2 | 10/2018 | Ahearn et al. |
| 10,325,430 B2 | 6/2019 | Eid |
| 10,679,439 B2 | 6/2020 | Han |
| 10,771,975 B2 | 9/2020 | Conrad et al. |
| 11,189,117 B2 | 11/2021 | Chang et al. |
| 11,373,470 B1 | 6/2022 | Nakagawa |
| 11,393,268 B2 | 7/2022 | Cartwright |
| 11,423,724 B2 | 8/2022 | Gomez Santamaria et al. |
| 2006/0170533 A1 | 8/2006 | Chioiu et al. |
| 2007/0290798 A1 | 12/2007 | Larson et al. |
| 2008/0174403 A1 | 7/2008 | Wolpert et al. |
| 2008/0288412 A1 | 11/2008 | Treffers et al. |
| 2012/0222103 A1* | 8/2012 | Bliding .............. G07C 9/00309 726/7 |
| 2014/0035721 A1 | 2/2014 | Heppe et al. |
| 2015/0356801 A1* | 12/2015 | Nitu ........................ G07F 9/002 340/5.61 |
| 2017/0116568 A1 | 4/2017 | Pleis |
| 2017/0147975 A1 | 5/2017 | Natarajan et al. |
| 2018/0253786 A1 | 9/2018 | Frisby et al. |
| 2019/0102962 A1 | 4/2019 | Miller et al. |
| 2019/0362577 A1 | 11/2019 | Vigil |
| 2020/0242863 A1* | 7/2020 | Chang ..................... H04W 4/80 |
| 2020/0250915 A1 | 8/2020 | Schachte et al. |
| 2020/0399929 A1* | 12/2020 | Hardter ................. H04L 9/3231 |
| 2021/0049846 A1 | 2/2021 | Kashi et al. |
| 2021/0059455 A1 | 3/2021 | Bowman |
| 2021/0074100 A1 | 3/2021 | Kashi et al. |
| 2022/0051514 A1 | 2/2022 | Schmidt et al. |
| 2022/0398883 A1 | 12/2022 | Belew et al. |

FOREIGN PATENT DOCUMENTS

| | | |
|---|---|---|
| IN | 201741021249 A | 12/2018 |
| KR | 2013-0127406 A | 11/2013 |
| WO | WO 2016/081017 A2 | 5/2016 |
| WO | WO 2019/161872 A1 | 8/2019 |

OTHER PUBLICATIONS

International Search Report and Written Opinion for International Application No. PCT/US2022/032809, mailed Sep. 29, 2022.
Third Party Observation for International Application No. PCT/US2022/032809, filed May 2, 2023.
Communication of Third Party Observation for Swedish Application No. 2151497-1, dated Nov. 21, 2023.

* cited by examiner

COMMUNICATION PROTOCOL FOR NON-INTERNET-ENABLED DEVICES

RELATED APPLICATIONS

This application claims the benefit under 35 U.S.C. § 119(e) to U.S. Provisional Application Ser. No. 63/208,562, filed on Jun. 9, 2021, which is herein incorporated by reference in its entirety.

FIELD

Some disclosed embodiments are related to a communication protocol for at least one non-internet-enabled device and related methods of use. The communication protocol may employ an intermediary internet-connected device to temporarily act as an authorized relay between at least one non-internet-enabled device and a server. In some embodiments, one of the non-internet-enabled devices may be able to temporarily communicate with the intermediary device on a local area network. In some embodiments, a non-internet-enabled device may be a locking device configured to secure a space (e.g., a locker or a set of lockers).

BACKGROUND

In many cases, electronically controlled devices are often configured with mechanisms for communicating with other devices. As one example, such devices are configured to communicate via local communication to another device in the immediate area of the electronically controlled device. As another example, in cases where it is desirable to connect electronically controlled devices to the internet, additional bridging hardware is often employed on a trusted network (e.g., a local area network of a building in which the electronically controlled device is disposed) to act as a permanent authorized relay between the local device and one or more servers on the internet (e.g., cloud infrastructure).

SUMMARY

In some embodiments, there is provided a method of synchronizing an electronically controlled set of lockers and at least one server providing access to the electronically controlled set of lockers, where the electronically controlled set of lockers does not have an internet connection and cannot communicate with the at least one server. The method includes receiving, at the set of lockers and from a client, a request for the client to operate the set of lockers, where receiving the request comprises receiving from the client an authorization granted to the client by the at least one server. The method also includes, in response to determining, based on the authorization, that the client is authorized to operate the set of lockers, operating the set of lockers based on one or more messages received from the client, and transmitting to the client, for communication to the at least one server, an event log, the event log comprising an indication that the set of lockers were operated based on the one or more messages received from the client.

In some embodiments, there is provided a method of updating a first device to reflect information located on at least one second device, where the first device and the at least one second device cannot communicate with one another, the method comprising: receiving, at the first device and from a third device, a request for the first device to communicate with the third device, the request comprising an authorization to communicate provided by the at least one second device; and in response to determining, based on the authorization of the request, that the third device is authorized to communicate with the first device: receiving, at the first device and from the third device, information provided to the third device from the at least one second device, updating the first device based on the information received from the third device that was provided by the at least one second device, and transmitting, from the first device and to the third device, at least one message to be provided to the at least one second device.

A non-transient computer readable medium containing program instructions for causing a computer to perform a method of synchronizing an electronically controlled set of lockers and at least one server providing access to the electronically controlled set of lockers, wherein the electronically controlled set of lockers does not have an internet connection and cannot communicate with the at least one server, the method comprising: receiving, at the set of lockers and from a client, a request for the client to operate the set of lockers, wherein receiving the request comprises receiving from the client an authorization granted to the client by the at least one server; and in response to determining, based on the authorization, that the client is authorized to operate the set of lockers: operating the set of lockers based on one or more messages received from the client, and transmitting to the client, for communication to the at least one server, an event log, the event log comprising an indication that the set of lockers were operated based on the one or more messages received from the client.

A non-transient computer readable medium containing program instructions for causing a computer to perform a method of updating a first device to reflect information located on at least one second device, wherein the first device and the at least one second device cannot communicate with one another, the method comprising: receiving, at the first device and from a third device, a request for the first device to communicate with the third device, the request comprising an authorization to communicate provided by the at least one second device; and in response to determining, based on the authorization of the request, that the third device is authorized to communicate with the first device: receiving, at the first device and from the third device, information provided to the third device from the at least one second device, updating the first device based on the information received from the third device that was provided by the at least one second device, and transmitting, from the first device and to the third device, at least one message to be provided to the at least one second device.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
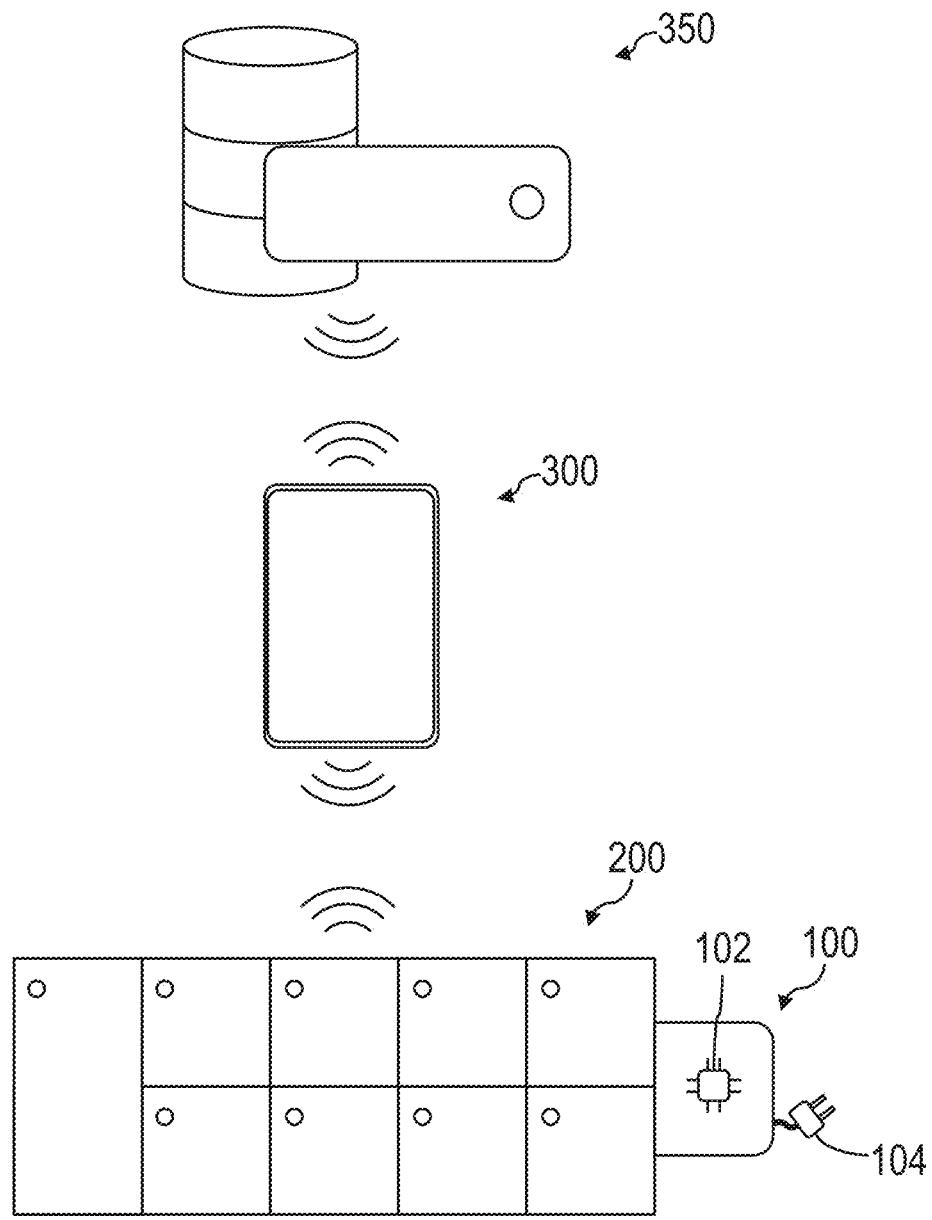
FIG. 1 is a schematic of one embodiment of a system for providing communication between two devices that are not able to communicate with one another directly.

Electrified devices are often desirable for usability and convenience and may be configured to communicate on a local area network or directly with another local device in a wired or wireless manner. However, in many instances, it is not practical or desirable to have electrified devices directly connected to the internet. For example, in some instances an electrified device may be battery powered, which may make power-intensive direct internet connections (including wireless connections) undesirable to mitigate an impact on the device's battery life. As another example, in some instances an electrified device may be located in a remote area, where reliable internet access is not possible, or even when in a geographic area where reliable internet may be available, may be at a location within a building without a reliable wireless network connection (e.g., inside a building that such signals do not reliably penetrate, or in basement or other lower level that such signals do not reliably reach) or where it is infeasible to run a wired connection. In yet another example, in some instances an electrified device may be located where a local internet connection is untrusted or a location that does not want to provide internet access to the device (e.g., in many commercial locations where ownership of the internet access point and electrified device are different). Accordingly, electrified devices are often left unconnected to the internet.

In many such cases, the electrified devices that are not internet-enabled may not communicate with other devices via a wired and/or wireless connection, or may communicate solely via direct local connections within the immediate area of the electrified device and without communicating to the internet. Such connections, as they are not internet connections, do not allow a remote device that is outside of the immediate area to communicate with the electrified devices. As such, a cloud service or other server is not able to track information regarding or status of a non-internet-enabled device, send commands to the non-internet-enabled device, or otherwise manage the non-internet-enabled device.

A lack of internet connection for an electrified device can reduce or diminish the potential functionality of device. For example, in the context of an electrified locking device, an electronic key is oftentimes employed to lock or unlock the locking device on command from a client device. For the locking device to be unlocked, the client device may obtain an authorized electronic key from a central server or cloud service. For the key to be functional to unlock the device using this approach, both the locking device and the server need to be aware of the same key, such that the key provided by the server to the client device is known to the locking device and thus will be accepted by the locking device and cause unlocking. For a non-internet-enabled locking device, this key may be static and unchanging, as the central server or cloud service are not able to communicate regarding new keys with the locking device—because the central server or cloud service is not able to communicate at all with the locking device. Having a static and unchanging security key may be a security risk.

Accordingly, an arrangement where a locking device is not internet-enabled may have diminished security compared to a connected locking device which may receive updated keys from a central server or cloud service. Unfortunately, locking devices may be located in areas where reliable internet connections are unavailable, as discussed above. Such difficulties and disadvantages (for security or other concerns) may also exist for electrified devices that operate in other domains or provide other functions, beyond locking/securing.

In view of the above, the inventors have recognized the benefits of a communication method of updating a first device to reflect information located on at least one second device, where the first device and the at least one second device cannot communicate with one another (e.g., via the internet or other wide area network). The second device(s) in some such cases may be one or more servers and the first device may be a non-internet-enabled device. The device may not be enabled for internet for a variety of reasons, as embodiments are not limited in this respect. In one particular example, the inventors have recognized the benefits of a method of synchronizing an electronically controlled set of lockers and at least one server providing access to the electronically controlled set of lockers, where the electronically controlled set of lockers does not have an internet connection and cannot communicate with the at least one server.

The methods may involve employing an untrusted client device (e.g., a smartphone, computer, tablet, handheld mobile device, etc.) as a communications relay for information between a first device (e.g., an electrified device) and a second device (e.g., at least one server). The interaction between the client and the first device may be initiated by the client and authorized by the second device, so that the client may operate the first device. The client may communicate with the first device for the purpose of operating the first device, such as requesting performance of an operation by the first device or otherwise triggering the first device to perform an operation. The client's communications with the first device may also include data to be communicated to the first device from the second device, enabling the client to serve as a form of bridge between the first device and the second device and enable data provided by the second device to be communicated to the first (and/or vice versa). Information passed between the first device and second device may be encrypted and indecipherable to the client device, thereby ensuring security of the temporary communications bridge formed between the first device and second device.

The communication protocols and methods described herein may be applicable to a wide range of electrified devices configured for local communication, including locking devices (e.g., lockers, smart locks, etc.), smart home devices, or any other normally non-internet-enabled device that may be desirable to connect to the internet as part of the Internet of Things (IoT). Accordingly, while various examples are given herein of use of these techniques in connection with locking devices, lockers, and sets of lockers, and the inventors have appreciated that the techniques described herein may be of particular utility and advantage when used in that context, it should be appreciated that embodiments are not limited in this respect and the techniques may be used with other devices.

In some embodiments, a method of updating a first device to reflect information located on at least one second device is provided, where the first device and the at least one second device cannot communicate with one another. For example, the first device and at least one second device may be on networks isolated from one another such that the first device and at least one second device cannot directly communicate with one another. As another example, the first device may not be on any such network or may not be internet enabled, and the at least one second device may be connected to the internet. The method may include receiving from a third device (e.g., a client device) a request for the first device to communicate with that third device. The request received by the first device from that third device may include an authorization to communicate with the first device, where that authorization is provided by the at least one second device. For example, the at least one second device may be a server that grants authorization for the third device to communicate with the first device. The first device may verify the authorization of the third device before communicating with the third device.

The method may also include receiving information at the first device from the third device (e.g., a client). The information may have been originally generated and/or provided by the at least one second device, such as by being provided to the third device by the second device. The information may include one or more commands, a key, a request, or any other desired information. In some embodiments, the information intended for the first device may be communicated to the third device and to the first device in a form that makes the information indecipherable to the third device. For example, the information may be encrypted, and the first device may hold the appropriate decryption key while the third device does not hold the encryption or decryption key. The second device may have initially encrypted the information, in some such cases, prior to the second device providing the encrypted information to the third device. The second device may have provided the (encrypted) information to the third device for the third device to in turn provide the (encrypted) information to the first device. According to such an embodiment, the method may include decrypting the information on the first device. In cases where the information includes one or more commands, in some embodiments the method may include transmitting from the first device one or more responses based on the one or more commands. The one or more responses may be confirmation messages or other information sent back to the at least one second device based on the one or more commands. In some embodiments, the one or more responses may be transmitted to the third device, and the third device may transmit the one or more responses to the at least one second device. The method may also include updating the first device based on the information received from the third device that was provided by the at least one second device. For example, the information may include a new key to be implemented by the first device.

In some embodiments, the method may also include transmitting, from the first device to the third device, at least one message to be provided to the at least one second device from the first device. That is, the at least one message may be transmitted to the third device from the first device, and the third device may transmit the at least one message to the at least one second device. The at least one message may include request responses, commands, or any other suitable data or information. In some embodiments, the at least one message may include an event log. The event log may include a series or listing of events that occurred on the first device, such as events that have occurred since an indicated time or since a last event log transmission by the first device. The event log may also include an indication that the first device was operated based on one or more messages or commands received from the third device. In some embodiments, the event log may include events that occur at the first device prior to receiving the request from the third device. The event log may include any number of events that occurred at the first device, as the present disclosure is not so limited. In some embodiments, the event log may be indecipherable by the third device, such that the third device is not able to read or access the contents of the event log. In such an embodiment, the event log may be decrypted at the at least one second device.

As discussed above, methods according to some exemplary embodiments described herein are applicable to a wide variety of devices. The inventors have appreciated specific benefits related to lockers that may be accessible for storage of parcels for a time. The parcels may be stored by one party for later retrieval by the same party, or stored and retrieved by different parties. In some cases, a party that stores a parcel may be a commercial carrier of goods that is delivering a parcel to the locker on behalf of a sender and for later retrieval by the recipient. Such locker may allow a user to retrieve a package in a secured location. In many instances it is desirable to place a set of lockers in a public or commercial location, where the lockers may be readily accessed by the public and the commercial carriers. However, in such locations, it may be difficult to provide secure internet access to the set of lockers. For example, in some locations there may be no suitable wireless network access point in range. In another example, it may be undesirable to connect a set of lockers through a network of an untrusted entity (e.g., a nearby commercial establishment). Accordingly, the inventors have appreciated the benefits of communication methods and protocols according to exemplary embodiments described herein are beneficial for use with sets of lockers that may be publicly accessible.

In accordance with techniques described herein, to access a locker, a user may use a client device (e.g., smartphone, personal computer, tablet, handheld mobile device, etc.) which may act as an untrusted communications bridge between the locker and at least one server (e.g., a cloud service). In this manner, at least one server may update a key on the locker, send one or more commands, retrieve event logs, retrieve other data, or otherwise manage the locker via the connected client device. As the client device is untrusted, the data exchanged via the client device may be encrypted or otherwise indecipherable to the client device. In this manner, usage of a set of lockers by one or more client devices may effectively allow the set of lockers to maintain regular communication with at least one server.

In some embodiments, a method of synchronizing an electronically controlled set of lockers and at least one server providing access to the electronically controlled set of lockers is provided, where the electronically controlled set of lockers does not have an internet connection and cannot communicate with the at least one server. For example, the set of lockers and the at least one server may be on networks isolated from one another such that the set of lockers and the at least one server cannot directly communicate with one another. In one such circumstance, the set of lockers may be configured to communicate on a local network or direct communication protocol (e.g., Bluetooth, Bluetooth Low Energy, Near Field Communication, 802.15.4, etc.) As another example, the set of lockers may be disconnected from the internet, while the at least one server may be connected to the internet. The method may include receiving a request for the set of lockers to communicate with the client device from the client device. For example, the client device may be a smartphone or other handheld mobile device requesting access to the set of lockers to retrieve a package from a specific locker or place a package in a locker. The request to the set of lockers may include an authorization to communicate with the set of lockers that is provided by the at least one server. For example, at least one server may grant a key to the client that allows the client to operate the set of lockers. The set of lockers may verify the authorization of the client device before communicating with the client device.

In some embodiments, the method of synchronization may include maintaining a locker buffer at the set of lockers and a server buffer at the at least one server. The device buffer and server buffer may include messages for communication to the at least one server and set of lockers, respectively. The set of lockers may store in memory the latest message received (or an index of said message, or other information indicating or identifying the message or a time associated with such message) from the at least one server and the latest message (or an index of said message, or other information indicating or identifying the message or a time associated with such message) that the at least one server has acknowledged receiving. Likewise, the at least one server may store in memory the latest message received (or an index of said message, or other information indicating or identifying the message or a time associated with such message) from the set of lockers and the latest message (or an index of said message, or other information indicating or identifying the message or a time associated with such message) that the set of lockers has acknowledged receiving. Using this information, the set of lockers and/or the at least one server may trim the messages stored in the device buffer and server buffer, respectively, to only include messages which have not yet been acknowledged or such that only a limited number (e.g., messages not yet transmitted or not yet acknowledged, or from a time following a time a last acknowledged message was transmitted, or messages that followed a last acknowledged message) are transmitted when an opportunity arises for transmission of a message from the buffer. For example, messages in the device buffer may be removed (e.g., deleted) from the device buffer if those messages have been previously acknowledged by the at least one server as having been successfully received. Likewise, messages in the server buffer may be removed (e.g., deleted) from the server buffer if those messages have been previously acknowledged by the set of lockers as having been successfully received. In some embodiments, the device buffer may be trimmed by the set of lockers when an acknowledgement from the at least one server is received. For example, a message may be kept in the device buffer for transmission to the at least one server via a client device until an acknowledgement of successful receipt of the message is received from the server via a client device. Once the acknowledgement is received, the message may be deleted from the device buffer. Similarly, the server buffer may be trimmed when an acknowledgement of successful receipt is received from the set of lockers. For example, a message for the set of lockers may be kept in the server buffer until acknowledgement of successful receipt of the message is received from the set of lockers via a client device, whereupon the message may be deleted from the server buffer. Such an arrangement may reduce the number of redundant messages transmitted between a set of lockers at least one server.

In some embodiments, the method may also include operating the set of lockers with the client device after the client is determined to be authorized. Operating the set of lockers may include sending one or more commands from the client device to the set of lockers. For example, in some embodiments the client device may send an open locker request to the set of lockers. According to this example, the set of lockers may open one or more lockers of the set of lockers based on the client device command. In some embodiments, the client device may send a lock locker request to the set of lockers, in response to which the set of lockers may lock the one or more lockers. In some embodiments, the set of lockers may send one or more response messages to the client based on the one or more commands send from the client. The one or more response messages may confirm that an action was taken at the set of lockers that corresponds to the one or more commands. Additionally, if there is an error, the one or more response messages may indicate the error to the client device. In some embodiments, when the client device is authorized, the set of lockers may assign one locker of the set of lockers to the client device. According to some such embodiments, the method may include operating the assigned locker with the client device. In some embodiments, the client device may communicate with a locker controller which controls the set of lockers.

In some embodiments, the method may also include transmitting one or more server messages to the set of lockers from the at least one server via the client device while the client device is in communication with the set of lockers. In some embodiments, the one or more server messages intended for the set of lockers may be indecipherable to the client device. For example, the one or more server messages may be encrypted, and the set of lockers may hold the appropriate decryption key. According to such an embodiment, the method may include decrypting the one or more server messages on the set of lockers. In cases where the one or more server messages includes one or more commands, in some embodiments the method may include transmitting from the set of lockers one or more responses based on the one or more commands. The one or more responses may be confirmation messages or other information sent back to the at least one server based on the one or more commands. In some embodiments, the one or more responses may be transmitted to the client device, and the client device may transmit the one or more responses to the at least one server. The method may also include updating the set of lockers based on the one or more server messages received from the client device that was provided by the at least one server. For example, the one or more server messages may include a new key to be implemented by the set of lockers.

In some embodiments, the method may also include transmitting an event log of the set of lockers to the client device for subsequent transmission to the at least one server. The event log may include a series of events that occurred on the set of lockers. The event log may also include an indication that the set of lockers were operated based on one or more messages or commands received from the client device. In some embodiments, the event log may include events that occur at the set of lockers prior to receiving the request from the client device. In some embodiments, the event log may include events that occurred between the last event log transmission and the request from the client device. The event log may include any number of events that occurred at the set of lockers, as the present disclosure is not so limited. In some embodiments, the event log may be indecipherable by the client device, such that the client device is not able to read or access the contents of the event log. In such an embodiment, the event log may be decrypted at the at least one server. In some embodiments, the at least one server may update a database based on the event lock received from the set of lockers via the client device. The event log may be configured for transmission to the at least one server by the client device before, during, or after the client device terminates a session with the set of lockers. That is, the event log may be transmitted to the client device from the set of lockers, and the client device may transmit the event log to the at least one server. In some embodiments, the event log may be transmitted from the client device to the at least one server upon termination of a session between the set of lockers and the client. In some embodiments, the event log may be transmitted from the client device to the at least one server prior to terminating a session with the set of lockers, to ensure that the event log is transmitted by the client device. For example, the set of lockers may not allow a locker to lock or unlock before the client device transmits the event log to the at least one server.

In some embodiments, a system configured to employ communication methods and protocols according to exemplary embodiments described herein includes at least one server (e.g., a cloud service) and one or more lockers having a locker controller. The at least one server may include a database and one or more server processors configured to manage one or more sets of lockers. The server processor(s) may be configured to execute one or more sets of computer-executable instructions stored on computer-readable storage onboard the at least one server. The storage may be implemented as one or more volatile and/or non-volatile storages, such as non-volatile memory. The server processor(s) may be configured to receive information from the locker controller, including sensor information, messages, and event logs. The server processor(s) may also be configured to command the locker controller. For example, the server processor(s) may command a locker controller to implement a new key. As discussed previously, the commands may be transmitted to the locker controller via an untrusted client device. Accordingly, the server processor(s) may also be configured to communicate with one or more other devices. For example, the server processor(s) may send or receive information to or from a client device such as a smartphone, respectively. In some embodiments, the server processor(s) may communicate with the client device via the internet. The locker controller may also include one or more locker processors. The locker processor(s) may be configured to execute one or more sets of computer-executable instructions stored on computer-readable storage onboard the locker controller. The storage may be implemented as one or more volatile and/or non-volatile storages, such as non-volatile memory. The locker processor(s) may be configured to receive information from the at least one server, including commands, keys, and information. As discussed previously, the commands, keys, and information may be transmitted to the locker controller via an untrusted client device. Accordingly, the lockers processor(s) may also be configured to communicate with one or more other devices. For example, the locker processor(s) may send or receive information to or from a client device such as a smartphone, respectively.

In some embodiments, a method of operating a set of lockers includes receiving a key at a client device from a server. The key may be configured to provide access to a specific locker, as identified by a locker ID. The method may also include advertising a locker ID at a set of lockers to the client device. In some embodiments where multiple lockers are included and each have individual IDs, the method may include selecting at the client device the appropriate locker ID. The method may also include requesting a session to the locker, where the request includes the key previously granted by the server. The method may also include granting the session if the locker determines the key is authorized. The locker may determine the key is authorized by employing a stored key that was previously sent from the server to the locker, or calculated or determined by the locker based on information sent from the server to the locker, and the locker may grant a temporary session key to the client device. The method may include sending one or more commands from the client to the locker, which may be based on encrypted server messages. For example, in some embodiments, the one or more commands may include an open locker command or install key command that is sent in an encrypted packet from the server to the locker and is indecipherable to the client device. In some embodiments, the client device may be authorized by the server to send reopen locker commands if a predetermined time period has not passed after initially opening the locker, which may be granted by the locker. In some embodiments, the method also includes sending one or more responses by the locker to the client device and/or server. For example, the one or more responses may include a locker opened response to the client, or an event log that may be encrypted and sent back to the server via the client device. The method may also include terminating the session between the client device and the locker. The method may also include transmitting event data from the client or locker to the server. Finally, the method may also include updating the client and/or locker state on a server database.

In some embodiments, a method of removing a package from a locker according to exemplary embodiments described herein is provided. The method may first include viewing a locker ID on a client device. The method may also include selecting a locker ID (e.g., via a user interface). In some embodiments, a locker ID may be selected automatically based on an authorization granted by a server. The method may also include sending a session request to a locker corresponding to the locker ID, where the request includes an authorization granted by a server. The method may include receiving a message from the locker granting a session. The method may also include sending one or more commands to the locker from the client device. The one or more commands may include encrypted information sent from the server for transmission to the locker via the client device. In some embodiments, the one or more commands may include an open locker command, which may open the locker. In some embodiments, the method includes receiving one or more responses from the locker based on the one or more commands. For example, the one or more responses may include a confirmatory message that the locker was opened. The method may also include retrieving the package from the opened locker. The method may also include receiving an event log from the locker and transmitting the event log to the server. The event log may be encrypted and indecipherable to the client device. In some embodiments, the method may also include terminating the session with the locker.

In some embodiments, a method of depositing a package into a locker according to exemplary embodiments described herein is provided. The method may first include sending a session request to a locker controller configured to control one or more lockers, where the request includes an authorization granted by a server. The method may include receiving a message from the locker granting a session. The method may also include sending a request for locker availability to the locker controller from the client device. The request for locker availability may include one more optional parameters. For example, in some embodiments, the request for locker availability may include a size and weight of a package. In another example, in some embodiments the request for locker availability may include options to enable a reopening time period window for an end user and/or an option for physical keypad override. In some embodiments, the method includes receiving a response from the locker controller based on the request for availability, where the response may include options for available lockers. For example, the response may include an assigned for receiving a package or may provide a list of available lockers. The method may also include sending an open locker request to the assigned locker or one of the lockers provided in the response. In some embodiments, the method may also include receiving an additional response from the locker controller that the locker corresponding to the open locker request is opened. The method may also include depositing the package from the opened locker and closing a locker door. The method may also include receiving an event log from the locker controller and transmitting the event log to the server. The event log may be encrypted and indecipherable to the client device. In some embodiments, the method may also include terminating the session with the locker.

In some embodiments, a non-transient computer readable medium may contain program instructions for causing a computer to perform the exemplary methods described herein. For example, in some embodiments, a non-transient computer readable medium may contain program instructions for causing a computer to perform a method of synchronizing an electronically controlled set of lockers and at least one server. As another example, in some embodiments, a non-transient computer readable medium may contain program instructions for causing a computer to perform a method of updating a first device to reflect information located on at least one second device. In some embodiments, a non-transient computer readable medium may be located on at least one server, such that the program may be executed by the at least one server (e.g., by one or more server processors). In some embodiments, a non-transient computer readable medium may be located on a locker controller, such that the program may be executed by the locker controller (e.g., by one or more locker processors). In some embodiments, a non-transient computer readable medium may be located on a client device, such that the program (e.g., as a part of an application) may be executed by the client device (e.g., by one or more processors). In some embodiments, multiple non-transient computer readable mediums may be employed on at least one server, a client device, and a locker controller, where each non-transient computer readable medium contains program instructions for executing at least a portion of a method according to exemplary embodiments described herein.

According to exemplary embodiments described herein, communication methods may employ a variety of communication standards between devices. In some embodiments, a locker controller, locker, or set of lockers may communicate with a client device via Bluetooth, Bluetooth Low Energy, Near Field Communication, 802.15.4, Wi-Fi, or any other wired or wireless local area network standard. In some embodiments, a client device may communicate with at least one server via cellular standards (e.g., GSM, HSPA, CMDA), TCP/IP, or other wired or wireless wide area network standard. Various packet structures may be employed to ensure reliable communication between devices described herein, including, but not limited to, CBOR and JSON packet structures. Additionally, various encryption algorithms may be employed, including, but not limited to, SHA-256, AES-128, and ECC-256.

The inventors have appreciated that for devices that are operated by a variety of untrusted client devices in a public setting, it is desirable to provide new keys and/or rotate keys employed in authentication at the non-internet-enabled device (e.g., a set of lockers). Accordingly, the inventors have appreciated that communication methods and protocols described herein may be employed to automatically rotate keys on a non-internet-enabled device via the client devices using the non-internet-enabled device.

In some embodiments, a key library on a non-internet-enabled device (e.g., a locker) may have a first key type and a second key type. The first key type and second key type may be employed by the server and device to authorize client operation of the user device. In some embodiments, the server may determine a new encryption key of the first key type is desired and will generate a fresh key of the first key type flagged for install onto the device. As the server is unable to communicate with the device, the new key is in an unacknowledged state and is not yet used by the service. During a subsequent client device session with the non-internet-enabled device, the client device may send a server command to the non-internet-enabled device to install the new key, which replaces the old key of the first key type. The key of the second type will no longer be used to encrypt messages to the server, and the new key of the first key type will be used. However, the key of the second key type may still be employed to authenticate sessions between a client and the non-internet-enabled device. The client device may transmit an event log including the key install to the server, which may register the install of the new key. Next, the server will send server commands to revoke the old key of the first key type via the client device or another client device. Upon receiving confirmation of the revocation of the old key of the first type from non-internet-enabled device via a client device, the server may formally discard the old key of the first type. This arrangement allows the server to manage the keys present on the non-internet-enabled device and rotate them in an orderly fashion through the client intermediaries, with no gaps in authorization coverage. Of course, any suitable process may be employed for key rotation of one or more keys of a non-internet-enabled device, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a system for providing communication between two devices that are not able to communicate with one another directly. In the particular embodiment of FIG. 1, the system includes a set of lockers 200 (e.g., lockers), a client device 300 configured as a smartphone (e.g., a handheld mobile device), and server 350. Of course, in other embodiments any suitable client device may be employed, including a computer, tablet, or other device, as the present disclosure is not so limited.

As shown in FIG. 1, the set of lockers 200 includes a plurality of individual lockers, where each locker includes a lock configured to selectively lock or unlock a door, hatch, or other closure of the locker to secure a cavity or other receptacle into which an item can be put to store the item in the locker. The set of lockers also includes a locker controller 100 which control the set of lockers. The locker controller includes a locker processor configured execute one or more sets of computer-executable instructions stored on computer-readable storage onboard the locker controller. The storage may be implemented as one or more volatile and/or non-volatile storages, such as non-volatile memory. As shown in FIG. 1, the locker controller 100 also includes a power source 104. The power source of FIG. 1 is configured as a wall plug such that the locker controller receives a constant wired source of power. However, other arrangements are contemplated, including, but not limited to, power sources configured as batteries and/or solar panels.

According to the embodiment of FIG. 1, the server 350 includes one or more server processors configured execute one or more sets of computer-executable instructions stored on computer-readable storage onboard the server. The storage may be implemented as one or more volatile and/or non-volatile storages, such as non-volatile memory. The server also includes a database.

According to the embodiment shown in FIG. 1, the client device 300 is configured to communicate wirelessly with the locker controller 100 and the server 350. The client device 300 is configured to act as a temporary, untrusted communications bridge between the locker controller 100 and the server 350, as the locker controller 100 and server 350 are unable to communicate with one another directly due to the lack of internet connection for the set of lockers 200 (and locker controller 100). In some embodiments, the client device 300 communicates with the server 350 via an internet connection. In some embodiments, the client device may communicate with the locker controller 100 via a local-area or personal-area wireless protocol, such as Bluetooth, Bluetooth Low Energy, Wi-Fi, or Near Field Communication. Of course, other communication protocols are contemplated, and the present disclosure is not so limited in this regard.

Figure 2:
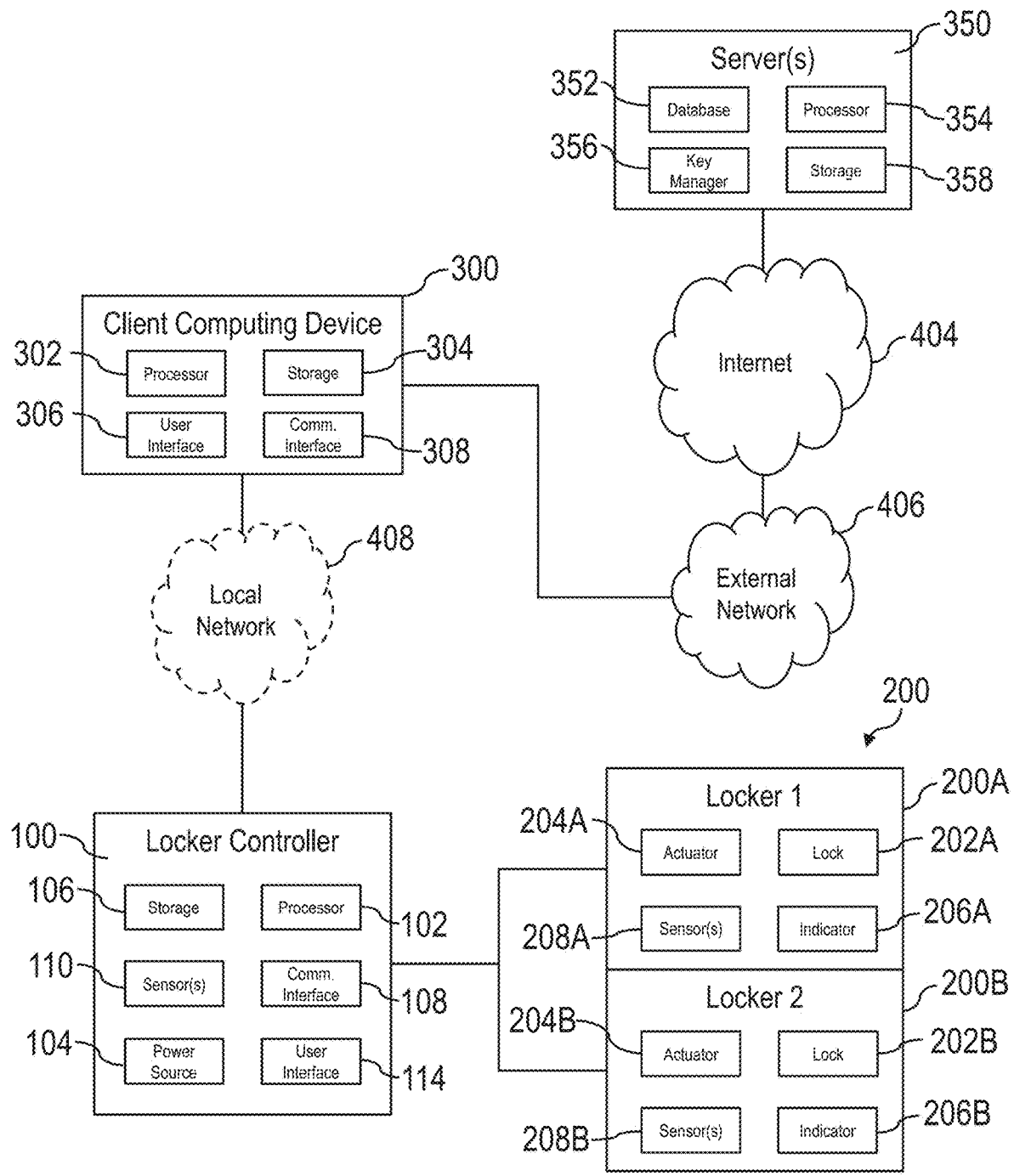
FIG. 2 is a block diagram of the illustrative system of FIG. 1.

FIG. 2 is a block diagram of the system of FIG. 1 showing the various components and the communication therebetween. As shown in FIG. 2, the locker controller 100 includes a processor 102, a power source 104, and storage 106. As discussed previously with reference to FIG. 1, the processor 102 may be configured to execute one or more sets of computer-executable instructions stored on the storage 106, which may be non-volatile storage. In some embodiments as shown in FIG. 2, the locker controller 100 also includes one or more sensors 110 which may measure various parameters related to the locker controller 100 or surrounding environment. For example, the one or more sensors 110 may include a temperature sensor, humidity sensor, motion detector, or any other sensor which may provide information to the processor 102. The locker controller 100 also includes a communications interface 108 which may be configured as a wireless transceiver, in some embodiments. The interface 108 may provide for communication within the immediate area of the locker controller 100, but not access to the internet. The communications interface 108 may manage the transmission and receipt of messages (e.g., to or from the server via the client device 300). As shown in FIG. 2, the communications interface 108 is configured to communicate via a local network 408 with the client device 300. In some embodiments as shown in FIG. 2, the locker controller 100 may include a user interface 114. The user interface may allow a user to interact directly with the locker controller 100. For example, a technician may service the set of lockers 200 or the locker controller 100 via the user interface 114.

As shown in FIG. 2, the locker controller 100 is configured to control a set of lockers 200. For clarity, only two lockers 200A, 200B are shown in the embodiment of FIG. 2, however any suitable number of lockers may be employed in other embodiments, as the present disclosure is not so limited. As shown in FIG. 2, the first locker 200A includes a lock 202A. The lock 202A may selectively secure a door or other aperture to selectively secure a space (e.g., a locker internal volume). For example, in some embodiments the lock 202A may lock or unlock a door of a locker to secure an interior space of the locker. As shown in FIG. 2, the first locker also includes an actuator 204A. The actuator may be configured to move the lock 202A between a locked state and an unlocked state. In some embodiments, the actuator may be configured to receive commands from the locker controller 100 and may change the state of the lock 202A based on the commands from the locker controller 100. In some embodiments as shown in FIG. 2, the first locker may also include an indicator 206A. The indicator 206A may indicate the state of the first locker. For example, the indicator 206A may indicate whether the lock 202A is in a locked state or an unlocked state. The indicator 206A may be configured as a light, speaker, display, or other arrangement configured to indicate a status of the first locker. In some embodiments as shown in FIG. 2, the first locker may also include one or more sensors 208A. The one or more sensors may provide information to the locker controller 100 regarding one or more conditions of the first locker. For example, the one or more sensors may include a temperature sensor configured to measure an interior temperature of a locker. As another example the one or more sensors may include a sensor configured to measure a state of the lock 202A between the locked and unlocked states.

As shown in FIG. 2, the set of lockers also includes a second locker 200B. The second locker 200B includes like components as the first locker 200A. That is, the second locker 200B includes a lock 202B, an actuator 204B, an indicator 206B, and one or more sensors 208B, which function similarly to the components discussed with reference to the first locker 200A. In some embodiments, the first locker and second locker may be identical. In other embodiments, the first locker 200A and second locker 200B may differ. For example, in some embodiments, the first locker 200A may have a first size and the second locker 200B may have a second, different size. Different sized lockers may be configured to accommodate different sizes of packages or items through an aperture of the locker. As another example, in some embodiments the first locker 200A may include components to regulate an interior environment of a locker (e.g., a refrigerator, dehumidifier, heater, etc.), while the second locker 200B may not have such components. Accordingly, in such an embodiment, the first locker 200A may be configured to receive perishable items, whereas the second locker 200B may receive non-perishable items. Thus, a set of lockers employed with a locker controller 100 may have any number of similar or different characteristics or components, as the present disclosure is not so limited.

According to the embodiment of FIG. 2, the client device 300 is configured to function as a temporary communications bridge between the locker controller 100 and a server 350. In some embodiments as shown in FIG. 2, the client device 300 includes a processor 302 and storage 304. The processor 302 may be configured to execute one or more sets of computer-executable instructions stored on the storage 304, which may be non-volatile storage. As shown in FIG. 2, the client device 300 may also include a user interface 306. A user may use the user interface 306 to operate the locker controller 100. For example, a user may use the user interface 306 to select a locker, send commands, and/or receive responses from locker controller 100. As shown in FIG. 2, the client device 300 also includes a communications interface 308, which may be configured as a wireless transceiver. The communications interface 308 of the client device 300 may communicate with the locker controller via a local network 408. The communications interface 308 of the client device may also communicate with the server 350 via an external network 406 (e.g., cellular network) which may be connected to the internet 404.

As shown in FIG. 2, the system also includes a server 350. The server 350 may be configured to coordinate and manage multiple sets of lockers 200. The server may also manage authentication for the client device 300 and other client devices, as well as the general usage of the system. As shown in FIG. 2, the server 350 includes a database 352, a processor 354, and storage 358. The processor may be configured to execute one or more sets of computer-executable instructions stored on the storage 358. The database 352 may be implemented as any suitable form of data storage that maintains information in any format, including as a relational database, flat file, or other format. The database 352 may include state information, sensor information, authentication information, or other information related to the locker controller 100 and the client device 300, and/or other locker controllers or client devices not shown. The server 350 may be configured to update the database 352 based on information received from the client device 300 or locker controller 100 via the client device 300. In some embodiments as shown in FIG. 2, the server 350 may also include a key manager 356, which may manage the authentication and other operation keys employed for communication from the client device 300 to the locker controller 100 and between the server 350 and locker controller via the client device.

According to the embodiment of FIG. 2, software may be employed on the server 350, client device 300, and locker controller 100 to control the operation and communication of the various components shown in FIG. 2. The server 350 may include server software configured to be executed by the server processor 354. The client device 300 may include a client application configured to be executed by the client device processor 302. The locker controller may include locker controller software configured to be executed by the locker controller processor 102. The various methods discussed below with reference to FIGS. 3-7 and portions thereof may be performed by the server software, client software, and/or locker controller software.

Figure 3:
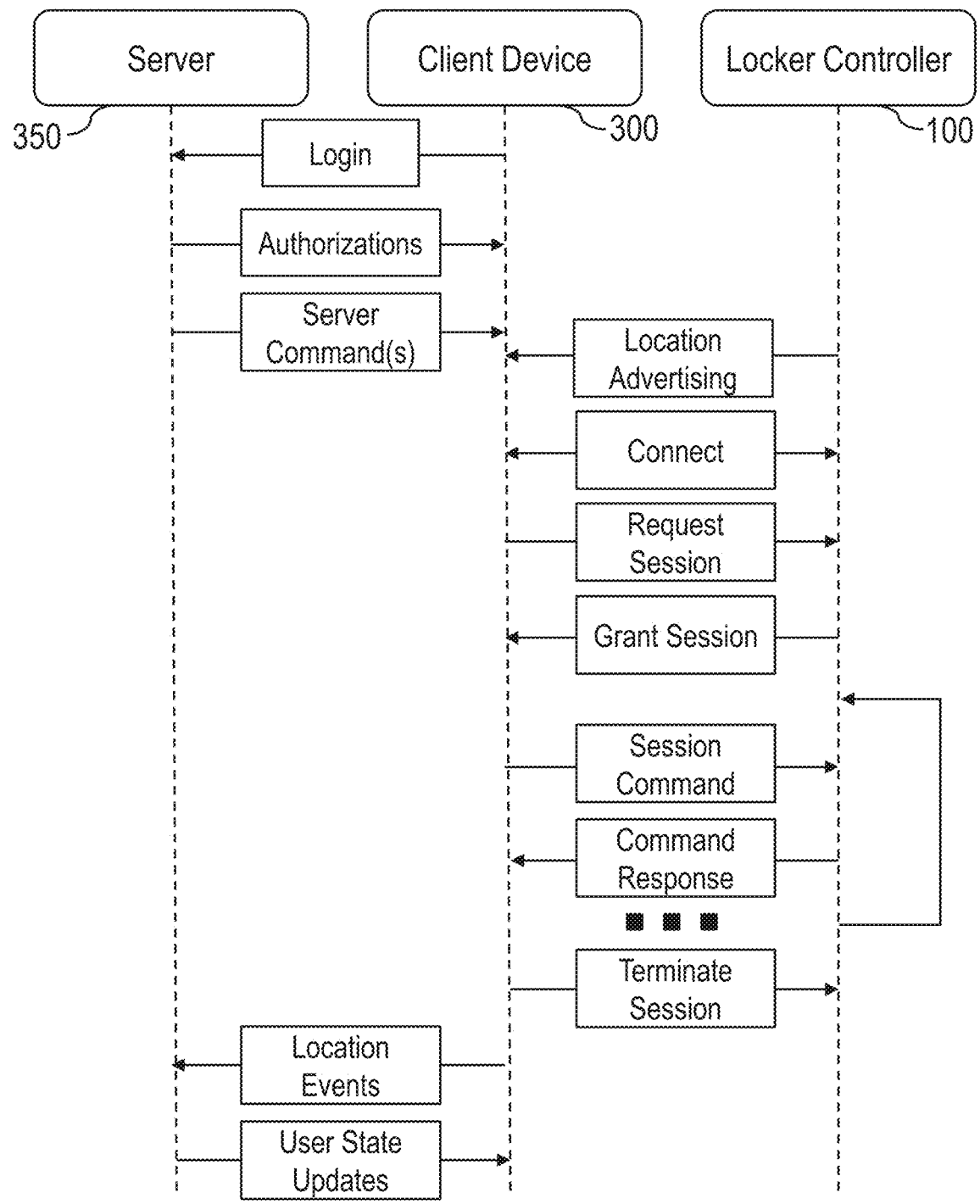
FIG. 3 is a flow diagram for one embodiment of a session between a client and locker controller according to some exemplary embodiments described herein.

FIG. 3 is a flow diagram for one embodiment of a session between a client device 300 and locker controller 100 according to some exemplary embodiments described herein. The session shown in FIG. 3 may be managed by software executed on the locker controller 100, client device 300, and a server 350. The session shown in FIG. 3 may be applicable for most user interactions with the locker controller 100, including, but not limited to, package retrieval and package drop-off. In the diagram of FIG. 3, time flows downward from the top of the page to the bottom of the page. As shown in FIG. 3, first a client application on the client device 300 submits a login request to the server 350. The server will then grant appropriate authorizations to the client device 300 based on the login request. These login and authorization operations may be performed by the server 350 and client device 300 while the client device is in proximity to the locker controller 100, or at an earlier time, as embodiments are not limited in this respect. The server 350 may carry out operations (e.g., with server software) to determine whether to grant an authorization to the client device 300. For example, in some embodiments, the server 350 may determine the authorizations based on a verified account login. In some embodiments, the server 350 may determine the authorizations based on verifying a credential (e.g., identification card, passcode, etc.) input by a user at the client device 300. In some embodiments, the server 350 may determine the authorizations based on information received from a connected cloud service (e.g., a commercial carrier). The server 350 may determine whether to grant authorizations and the type of authorization based on any suitable information input from the client device 300 and/or a connected service, as the present disclosure is not so limited.

The client device 300 may also receive advertisements from the locker controller 100 on a local network (e.g., Bluetooth), which for ease of illustration is shown in FIG. 3 as being received at the client device following grant of the authorizations to the client device. In response to these advertisements, the client device 300 may select a desired identifier (with a client application) for the nearby locker controller 100 and may connect to the selected locker controller. That is, in instances where multiple locker controllers advertise identifiers on a local network, the client device 300 may select one of the multiple identifiers for connection and subsequent operation. The client device 300 may request a session with the selected locker controller 100, which may include transmitting to the locker controller the authorizations previously granted by the server 350. The locker controller 100 may evaluate the requests (e.g., with locker controller software), including by evaluating the authorizations. If the locker controller 100 determines the authorizations are valid, the locker controller may open a communication session with the client device 300, which may be a secure session.

According to exemplary embodiments described herein, including the embodiment of FIG. 3, a server may not be able to send commands directly to a locker controller or other non-internet-enabled device. Accordingly, the server is configured to send commands to the locker controller or other device via an intermediary client device. When the client device requests authorization from the server to interact with a particular device (e.g., a locker controller), the server may become aware that the client device will be interacting with that particular device. Accordingly, in some embodiments, the server transmits the information and authorizations requested by the client device, but may additionally determine whether there other information and/or commands should be send to the particular device. If the server does determine that there is information and/or commands that should be communicated to that particular device, the server may send that information and/or commands to the client device so that the client device may relay the information and/or commands to the particular device when the client device is communicating directly with the particular device. Additionally, in some embodiments and as discussed previously, the server may encrypt or otherwise secure the information and/or commands intended to be transmitted to the particular device, such that the client cannot understand or access the information and/or commands. One exemplary embodiment of transmitting information and/or commands from the server to a particular device is discussed further below with reference to FIG. 3.

Once the session is granted and opened, the client device 300 may send one or more session commands to the locker controller 100 via the session. The session commands may originate from the client device 300 and/or may include server commands from the server 350 that were received at the client device from the server. In some embodiments as shown in FIG. 3, the client device 300 may receive the server commands with the authorizations granted by the server 350. In other embodiments, the client device 300 may receive the server commands from the server 350 after the client device establishes a session with the locker controller 100 prior to sending one or more session commands, and the present disclosure is not so limited in this regard. The session commands and server commands may cause the locker controller 100 to update or otherwise perform operations based on the session commands and/or server commands received from the client device 300. For example, in some embodiments, a session command may include an "open locker" command, in response to which the locker controller 100 may unlock a locker. As another example, in some embodiments, a server command may include a new encryption key as a part of an "install key" command sent by the server 350 via the client device 300. In response to receiving the server's install key command from the client device 300, the locker controller 100 may install the new encryption key. As yet another example, in some embodiments, a server command may include a setting command configured to change a setting or parameter of the locker controller 100. The setting may include, but is not limited to, a session timeout time, power saving settings, and location identifier name. Accordingly, the client device 300 may relay server commands to the locker controller 100 such that locker controller may be updated based on the server commands.

The locker controller 100 may also acknowledge a session command and/or server command by transmitting a command response during the session to the client device 300. The command responses may include event log data from the locker controller 100 or other acknowledgments that are intended to be relayed to the server 350. The server acknowledgements and/or event log data may be indecipherable by the client device 300. The process of submitting commands and receiving responses may continue with any number of commands and responses, to operate the locker controller 100 and/or update one or more states of the locker controller. The client device 300 may eventually terminate the session with the locker controller once the desired operation is completed. Once the session is terminated, the client device 300 may transmit the event log to the server 350. Based on the event log, the server 350 may update user states on the client device 300. The user states may include authorizations. For example, in response to a user request for an authorization, the server 350 may grant and maintain an authorization for the user to interact with the locker. Following a session between the client device 300 and the locker controller 100, and more particularly following receipt of an event log demonstrating that a session related to the authorization has been conducted, the server 350 may revoke the authorizations previously granted to the user or client device 300. Other user states may also be updated, including information such as number of parcels associated with user available for pick-up. In some embodiments, the locker controller 100 may transmit multiple event logs to the client device 300 in response to one or more session and/or server commands. In one such embodiment, the locker controller 100 may transmit an event log to the client device 300 for transmission to the server 350 in response to each session command and/or server command.

Accordingly, the session shown in FIG. 3 allows a server 350 to effectively communication with the locker controller 100 through the intermediary client device in a seamless manner.

In some embodiments, a server command sent to a client device 300 from a server 350 may be based on one or more command responses previously received at the server from the locker controller 100. For example, in some embodiments a server 350 may determine that a new key should be installed on the locker controller 100. The server 350 may first transmit to one client device, for communication during one session with the locker controller 100, an "install new key" server command instructing the locker controller 100 to install a new key. Based on the server command, the locker controller 100 may install the new key and, during the same session or a different session (with a same or different client device) send a command response via the client device for transmission to the server 350. The server 350 may subsequently receive the command response from the client device 300, either during the same session between the client device and the locker controller 100 for which the server command was first transmitted, following that session, or following a different session. In response to receiving that command response, the server 350 may send additional server commands to a client device (the same client device or a different client device) for transmission to the locker controller. These additional server commands may be responsive to or otherwise based on the command response. For example, the additional server command may include a "revoke old key" command. When received by the locker controller 100 from a client device, the locker controller 100 may act on the server command by deleting the old key indicated by the server command, which is the old key that was replaced by the earlier "install new key" command that instructed the locker controller 100 to configure a new key.

In this specific example of key management, the installation of new keys may be separated in time from disabling of old keys due to the (at least potential) asynchronous nature of communications via other devices. The server 350 and the locker controller 100 do not directly communicate, as discussed above. Rather, they communicate via one or more other devices, the client devices 300. And the timing of those communications may be different. The server 350 may in some cases transmit an authorization and server command to a client device 300 at one time that may be long before that same client device 300 travels to a location of the locker controller 100 and communicates with the locker controller 100 to provide the "install new key" command. Likewise, the command response from the locker controller 100 to the server 350 may not be communicated to the server 350 for a period of time. During those time lags from when the server command is sent and the command response is received, one or more other client devices may also request from the server 350 authorization to interact with the locker controller 100. As a result of the time lags, the server 350 may be unaware of whether the locker controller 100 has yet installed or successfully installed the new key and thus cannot reliably instruct the other client devices to use the new key. In addition, one or more client devices may have requested and received authorizations to interact with the locker controller 100 prior to the server 350 issuing the "install new key" command and it may be desirable to provide time for those client devices to make their requested interactions. The asynchronous nature of the communications via these third party devices (e.g., the client devices) makes it advantageous, in the key management context, to separate installing of new keys and disabling of old keys, and thus creates advantages to sending subsequent server commands (via one or more different client devices) that are based on the command responses sent by a locker controller that are responsive to an initial server command. It should be appreciated, of course, that embodiments are not limited to using these techniques in accordance with key management or with locking units.

In this manner, states may be updated and synchronized between the server 350 and the locker controller 100 asynchronously, using one or more sessions between one or more client devices and the locker controller.

In some embodiments, the server command(s) and location events (e.g., an event log) may be transmitted based on the latest recorded acknowledgement from the locker controller 100 and server 350, respectively. In some embodiment, the locker controller 100 maintains a locker buffer and the server 350 maintains a server buffer. The device buffer may include location events, acknowledgements, or other information for transmission to the server 350 via the client device 300. The server buffer may include server command(s) or other information (e.g., keys) for communication to locker controller 100 via the client device 300. In some embodiments, the locker controller 100 may store in memory the latest message received from the at least one server and the latest message that the at least one server has acknowledged receiving. Likewise, the server 350 may store in memory the latest message received from the locker controller 100 and the latest message that the locker controller has acknowledged receiving. Using this information, the locker controller 100 and/or the server 350 may trim the messages stored in the device buffer and server buffer, respectively, to only include messages which have not yet been acknowledged. That is, messages in the device buffer may be removed (e.g., deleted) from the device buffer if those messages have been previously acknowledged by the server 350. Likewise, messages in the server buffer may be removed (e.g., deleted) from the server buffer if those messages have been previously acknowledged by the locker controller 100. In some embodiments, the device buffer may be trimmed by the locker controller 100 when an acknowledgement from the server 350 is received. For example, a message may be kept in the device buffer for transmission to the server 350 via the client device 300 until an acknowledgement of the message is received from the server via a client device. Once the acknowledgement is received, the message may be deleted from the device buffer by the locker controller 100. Similarly, the server buffer may be trimmed when an acknowledgement from the locker controller 100 is received. For example, a message for the locker controller 100 may be kept in the server buffer until acknowledgement of the message is received from the locker controller via client device 300, whereupon the message may be deleted from the server buffer by the server 350. Of course, in other embodiments any number of messages, including previously acknowledged messages, may be transmitted between a server 350 and a locker controller 100 via a client device 300, as the present disclosure is not so limited.

In this manner, states may be updated and synchronized between the server 350 and the locker controller 100 with non-redundant messages asynchronously, using one or more sessions between one or more client devices and the locker controller to transmit the non-redundant messages.

Figure 4:
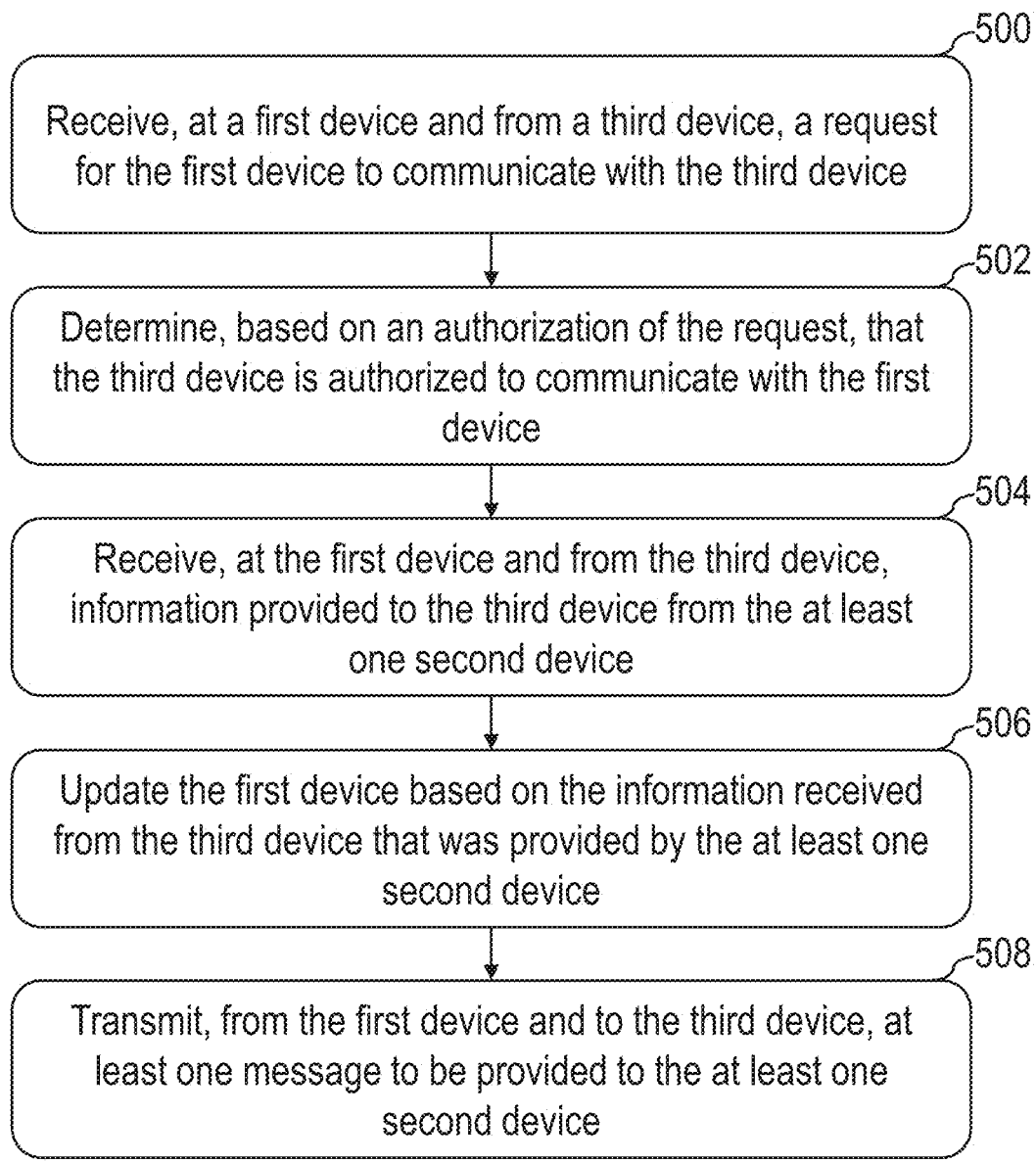
FIG. 4 is a flow chart of a method of synchronizing a first device and at least one second device according to some exemplary embodiments described herein.

FIG. 4 is a flow chart of a method of synchronizing a first device and at least one second device according to some exemplary embodiments described herein. The method may be performed by the exemplary systems shown and described with reference to FIGS. 1-2. Additionally, the method shown in FIG. 4 may be accomplished by the exemplary session flow shown in FIG. 3. However, the method of FIG. 4 is applicable to a variety of devices, including non-internet-enabled devices other than a locker controller. In block 500, the method includes receiving, at the first device and from a third device, a request for the first device to communicate with the third device. The request received at the first device may include authorizations granted by at least one second device (e.g., at least one server). The authorizations may be determined based on an identity of the third device, input from the third device, or information from a connected service. In block 502, the method further includes determining, based on an authorization of the request, that the third device is authorized to communicate with the first device. In some embodiments, determining that the third device is authorized to communicate may include verifying a key sent to the first device by the third device. In block 504, the method further includes receiving, at the first device and from the third device, information provided to the third device from the at least one second device. The information may include commands from the at least one second device that are configured to update one or more states of the first device. As should be appreciated from the foregoing, the commands or other information received by the third device from the at least one second device may be encrypted, secured, or otherwise formatted in a way to make the information indecipherable to the third device. In block 506, the method further includes updating the first device based on the information received from the third device that was provided by the at least one second device. For example, one or more settings on the first device may be updated based on the information. As another example, a new encryption key may be installed on the first device based on the information. Lastly, in block 508, the method also includes transmitting, from the first device and to the third device, at least one message to be provided to the at least one second device. The at least one message may include acknowledgements of the information received in block 504. Alternatively or additionally, the at least one message may include acknowledgements that an update was performed in block 506 based on the information received in block 504. The message(s) to be provided to the second device(s) by the third device may also be encrypted, secured, or otherwise formatted to be indecipherable to the third device.

In some embodiments, the method shown in FIG. 4 may be performed with multiple client devices. In such embodiments, the information received at the first device in block 504 may be based on at least one message previously transmitted to the client device. That is, in a prior method according to FIG. 4, information may be received at the first device and at least one message may be transmitted to the third device to be provided to the at least one second device. The at least one second device may receive the at least one message, which may confirm a state was updated on the first device in response to the information received during the prior method. In the subsequent iteration of the method, the information received by the first device from the at least one second device via the third device may be based on the previously transmitted at least one message. Accordingly, the at least one second device and the first device may communicate with one another via multiple devices during multiple iterations of the method shown in FIG. 4. During the multiple method iterations, states of the first device and the at least one second device may be updated and synchronized.

In one example of the method of employing multiple iterations of the method of FIG. 4, a method of updating a key employed on the first device is provided. In a first iteration of the method of FIG. 4, the method includes receiving, at the first device and from a third device (e.g., a "first client" device), a request for the first device to communicate with the third device in block 500. The request received at the first device may include authorizations granted by at least one second device. In block 502, the method further includes determining, based on an authorization of the request, that the third device is authorized to communicate with the first device. In block 504, the method further includes receiving, at the first device and from the third device, information provided to the third device from the at least one second device. The information includes a command to install a new encryption key. In block 506, the first device may update and install the new encryption key based on the command received in block 504. As the at least one second device is unable to communicate directly with the first device, the new key is in an unacknowledged state and may not yet be used by the first device or at least one second device. In block 508, at least one message acknowledging the successful install of the new key may be transmitted to the at least one second device via the third device. In a second iteration of the method of FIG. 4, a fourth device (e.g., a "second client" device) may submit a request to the first device to communicate in block 500, and the first device may determine that the fourth device is authorized. In block 504, the first device may receive information from the fourth device including a command from the at least one second device to use the previously installed key. In block 506, the first device may update a state to use the previously installed key, and in block 508 may transmit at least one message acknowledging the state change of the first device. In a third iteration of the method of FIG. 4, a fifth device (e.g., a "third client" device) may submit a request to the first device to communicate in block 500, and the first device may determine that the fifth device is authorized. In block 504, the first device may receive information from the fifth device including a command from the at least one second device to revoke the old key. In block 506, the first device may discard the old key, and in block 508 may transmit at least one message acknowledging the state change of the first device. Thus, according to this example, the first device and at least one second device may update and synchronize states using multiple iterations of the method of FIG. 4 with multiple intermediary devices. Any number of devices may be employed across multiple iterations of the method of FIG. 4, and the present disclosure is not so limited in this regard. Additionally, the iterations of the method of FIG. 4 may immediately follow one another, or may be spaced apart in time, as the present disclosure is not so limited.

In some embodiments, the method of FIG. 4 may further include maintaining a first device buffer at the first device and a second device buffer at the at least one second device. The first device buffer and second device buffer may include messages for communication to the at least one second device and first device, respectively. In some embodiments, the method further includes storing in memory, at the first device, the latest message received from the at least one second device and the latest message that the at least one second device has acknowledged receiving. Likewise, in some embodiments, the method further includes storing in memory, at the at least one second device, the latest message received from the first device and the latest message that the first device has acknowledged receiving. Using this information, the method may further include trimming the messages stored in the first device buffer and second device buffer, to only include messages which have not yet been acknowledged. That is, messages in either the first device buffer or second device buffer may be removed (e.g., deleted) from the respective buffer if those messages have been previously acknowledged by the recipient device. Such an arrangement may reduce the number of previously acknowledged messages transmitted between a first device and at least one second device via a third device.

Figure 5:
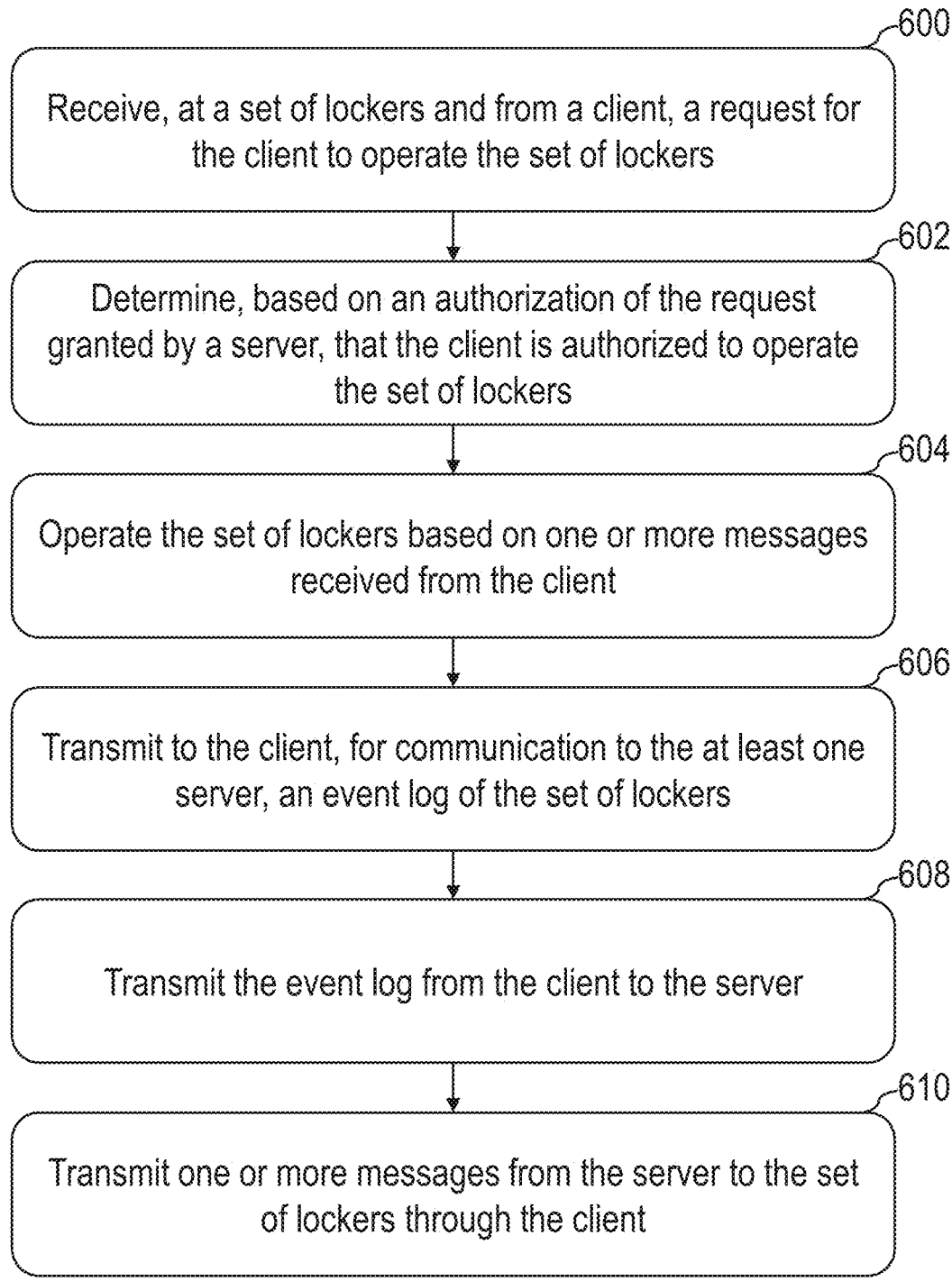
FIG. 5 is a flow chart of a method of synchronizing an electronically controlled set of lockers and at least one server according to some exemplary embodiments described herein.

FIG. 5 is a flow chart of a method of synchronizing an electronically controlled set of lockers and at least one server according to some exemplary embodiments described herein. The method of FIG. 5 shows operations of a locker controller as a part of a system according to the exemplary embodiments of FIGS. 1-2. The method of FIG. 5 may also be accomplished by the exemplary session flow shown in FIG. 3. In block 600, the method includes receiving, at a set of lockers and from a client, a request for the client to operate the set of lockers. In block 602, the method includes determining, based on an authorization of the request granted by a server, that the client is authorized to operate the set of lockers. In some embodiments, the server may determine the authorizations based on verifying a credential (e.g., identification card, passcode, etc.) input by a user at the client. In some embodiments, the server may determine the authorizations based on information received from a connected cloud service (e.g., a commercial carrier). In block 604, the method further includes operating the set of lockers based on one or more messages received from the client, which may include commands from the client (e.g., an unlock command) and server commands relayed by the server via the client (e.g., an install new key command, adjust clock command, override locker state command, or other setting update command). The override locker state command may force the lockers to update a state of a locker (e.g., locked or unlocked status, availability for delivery, keycode, etc.) based on the command. In some embodiments, the override locker state command may be a command configured to revert a state of a locker to a condition prior to the previously issued command. In some embodiments, such a command may make a locker available after an attempted delivery that failed (e.g., if a parcel did not fit in the locker). For example, a delivery person may accidentally select a locker of the incorrect size and may wish to select a different locker. In such an example, the override lock state command may be sent to the set of lockers to revert the previously selected locker to an available state for a future delivery. In some embodiments, the override locker state command may be employed during maintenance to reset of state of a locker to a desired state, test a locker, or otherwise configure a locker. In some embodiments, the type and availability of the override locker state command to a client device may be based on the authorizations received from the server by the client device. For example, authorized maintenance staff may have access to override any locker state, whereas a delivery person may only be able to revert a locker state.

According to the embodiment of FIG. 5, in block 606 the method further includes transmitting to the client, for communication to the at least one server, an event log of the set of lockers and/or a command response. In block 608, the method further includes transmitting the event log from the client to the server. Lastly, in block 610, the method includes transmitting one or more messages from the server to the set of lockers through the client.

Figure 6:
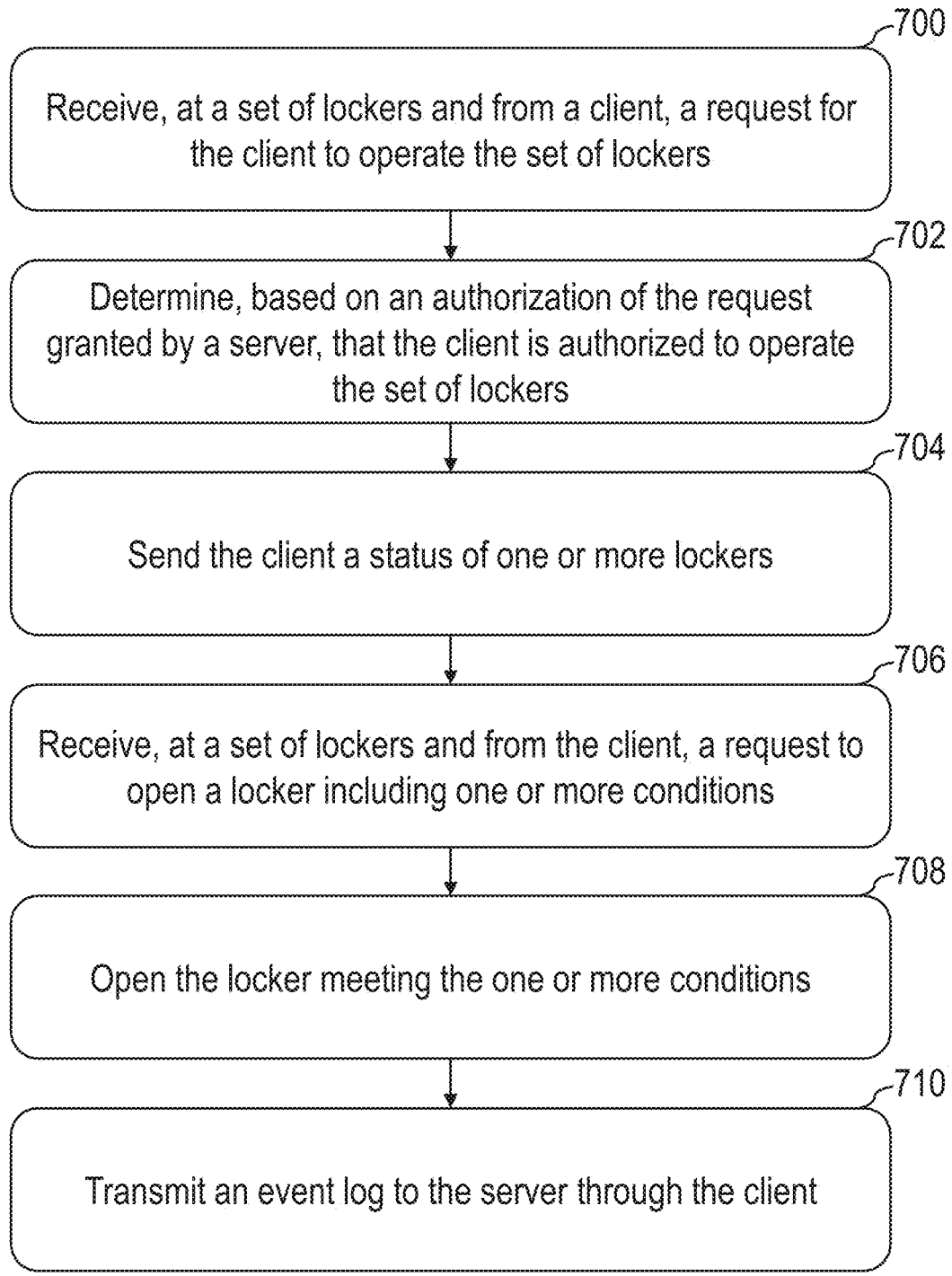
FIG. 6 is a flow chart of a method of synchronizing an electronically controlled set of lockers and at least one server according to some exemplary embodiments described herein.

FIG. 6 is a flow chart of a method of synchronizing an electronically controlled set of lockers and at least one server according to some exemplary embodiments described herein. In particular, the method shown in FIG. 6 may correspond to a method for depositing a package in a locker. The method of FIG. 6 shows operations of a locker system according to the exemplary embodiments of FIGS. 1-2. The method of FIG. 6 may also be partially accomplished by the exemplary session flow shown in FIG. 3. In block 700, the method includes receiving, at a set of lockers and from a client, a request for the client to operate the set of lockers. In block 702, the method includes determining, based on an authorization of the request granted by a server, that the client is authorized to operate the set of lockers. In block 704, the method includes sending the client a status of one or more lockers. For example, in some embodiments, the status of one or more lockers may include availability, temperature, size, and/or identification (e.g., locker number). In block 706, the method further includes receiving, at a set of lockers and from the client, a request to open a locker including one or more conditions. In block 708, the method further includes opening the locker meeting the one or more conditions. In some embodiments, opening the lock meeting the one or more conditions may include assigning one locker of the set of lockers to the client device for operation. In block 710, the method further includes transmitting an event log to the server through the client.

Figure 7:
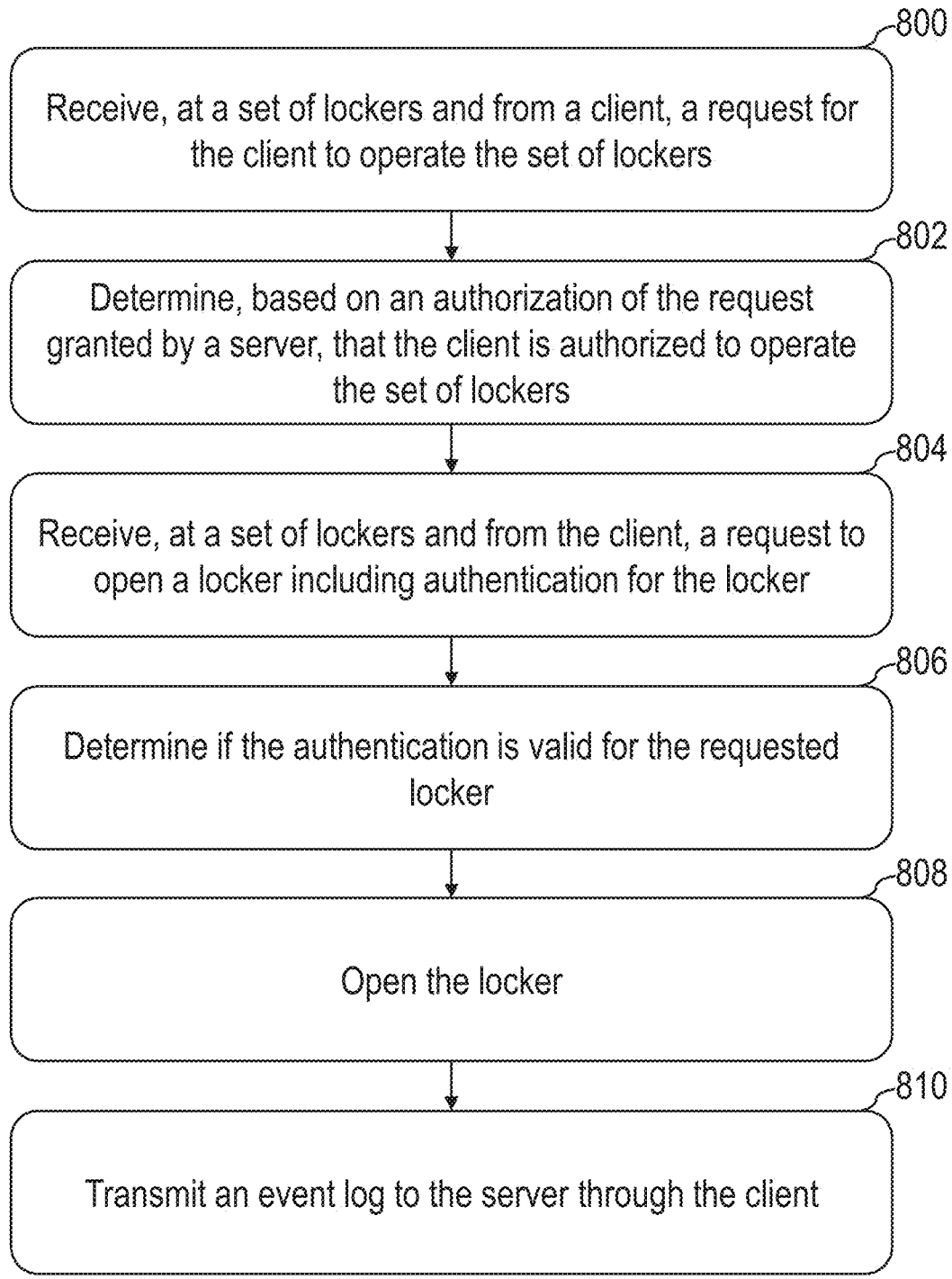
FIG. 7 is a flow chart of a method of synchronizing an electronically controlled set of lockers and at least one server according to some exemplary embodiments described herein.

FIG. 7 is a flow chart of a method of synchronizing an electronically controlled set of lockers and at least one server according to some exemplary embodiments described herein. In particular, the method shown in FIG. 7 may correspond to a method for retrieving a package from a locker. The method of FIG. 7 shows operations of a locker system according to the exemplary embodiments of FIGS. 1-2. The method of FIG. 7 may also be partially accomplished by the exemplary session flow shown in FIG. 3. In block 800, the method includes receiving, at a set of lockers and from a client, a request for the client to operate the set of lockers. In block 802, the method further includes determining, based on an authorization of the request granted by a server, that the client is authorized to operate the set of lockers. In some embodiments, the method may further include assigning one lock of the set of lockers for operation by the client device. In block 804, the method further includes receiving, at a set of lockers and from the client, a request to open a locker including authentication for the locker. In block 806, the method further includes determining if the authentication is valid for the requested locker. In block 808, the method further includes opening the locker. In some embodiments, the method may also include reopening the locker based on receipt of a reopen request at the set of lockers. In some such embodiments, the reopen request may only be valid within a predetermined time period of the first opening of the locker in block 808. The predetermined time period may be set by the server. In block 810, the method further includes transmitting an event log to the server through the client.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Such processors may be interconnected by one or more networks in any suitable form, including as a local area network or a wide area network, such as an enterprise network or the internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of updating a first device to reflect information located on at least one second device, wherein the first device and the at least one second device cannot communicate with one another, the method comprising:
receiving, at the first device and from a third device, a request for the first device to communicate with the third device, the request comprising an authorization to communicate provided by the at least one second device; and
in response to determining, based on the authorization of the request, that the third device is authorized to communicate with the first device:
receiving, at the first device and from the third device, information provided to the third device from the at least one second device,
updating the first device based on the information received from the third device that was provided by the at least one second device, and
transmitting, from the first device and to the third device, prior to operating the first device and prior to terminating a session between the first device and the third device, an event log of the first device to be provided to the at least one second device wherein the at least one second device can receive the event log of the first device from the third device prior to the operating the first device and prior to the terminating the session between the first device and the third device.

2. The method of claim 1, wherein the first device is a locker, the at least one second device is a server, and the third device is a handheld mobile device.

3. The method of claim 2, wherein the operating the locker is performed based on one or more commands from the handheld mobile device to lock or unlock the locker and the event log of the first device is transmitted, from the locker to the handheld mobile device, prior to locking or unlocking the locker.

4. The method of claim 3, wherein the event log includes events that occurred at the first device prior to receiving the information from the first device at the third device.

5. The method of claim 1, wherein the information received at the first device from the third device is indecipherable by the third device.

6. The method of claim 5, wherein the information is encrypted, and wherein the method further comprises decrypting the information on the first device.

7. The method of claim 5, wherein the information includes a key.

8. The method of claim 1, wherein the event log is indecipherable by the third device.

9. The method of claim 8, wherein the event log is encrypted, and wherein the method further comprises decrypting the event log on the at least one second device.

10. The method of claim 1, further comprising receiving, at the first device and from the third device, one or more commands provided to the third device from the at least one second device, wherein operating the first device comprises operating the first device based on the one or more commands.

11. The method of claim 10, further comprising transmitting, to the third device and from the first device, one or more responses based on the one or more commands.

12. The method of claim 11, further comprising transmitting, to the at least one second device and from the third device, the one or more responses.

13. The method of claim 1, further comprising transmitting from the third device and to the at least one second device, at least one message upon termination of the session between the first device and the third device.

14. The method of claim 1, wherein the first device includes a plurality of locking devices.

15. The method of claim 14, further comprising assigning one of the plurality of locking devices to the third device for operation.

16. A non-transient computer readable medium containing program instructions for causing a computer to perform a method of updating a first device to reflect information located on at least one second device, wherein the first device and the at least one second device cannot communicate with one another, the method comprising:
receiving, at the first device and from a third device, a request for the first device to communicate with the third device, the request comprising an authorization to communicate provided by the at least one second device; and
in response to determining, based on the authorization of the request, that the third device is authorized to communicate with the first device:
receiving, at the first device and from the third device, information provided to the third device from the at least one second device,
updating the first device based on the information received from the third device that was provided by the at least one second device, and
transmitting, from the first device and to the third device, prior to operating the first device and prior to terminating a session between the first device and the third device, an event log of the first device to be provided to the at least one second device, wherein the at least one second device can receive the event log of the first device from the third device prior to the operating the first device and prior to the terminating the session between the first device and the third device.

17. The non-transient computer readable medium of claim 16, wherein the first device is a locker, the at least one second device is a server, and the third device is a handheld mobile device.

18. The non-transient computer readable medium of claim 17, wherein the operating the locker is performed based on one or more commands from the handheld mobile device to lock or unlock the locker and the event log of the first device is transmitted, from the locker to the handheld mobile device, prior to unlocking or locking the locker.

19. The non-transient computer readable medium of claim 18, wherein the event log includes events that occurred at the first device prior to receiving the information from the first device at the third device.

20. The non-transient computer readable medium of claim 16, wherein the information received at the first device from the third device is indecipherable by the third device.

21. The non-transient computer readable medium of claim 20, wherein the information is encrypted, and wherein the method further comprises decrypting the information on the first device.

22. The non-transient computer readable medium of claim 20, wherein the information includes a key.

23. The non-transient computer readable medium of claim 16, wherein the event log is indecipherable by the third device.

24. The non-transient computer readable medium of claim 23, wherein the event log is encrypted, and wherein the method further comprises decrypting the event log on the at least one second device.

25. The non-transient computer readable medium of claim 16, wherein the method further comprises receiving, at the first device and from the third device, one or more commands provided to the third device from the at least one second device, wherein operating the first device comprises operating the first device based on the one or more commands.

26. The non-transient computer readable medium of claim 25, wherein the method further comprises transmitting, to the third device and from the first device, one or more responses based on the one or more commands.

27. The non-transient computer readable medium of claim 26, wherein the method further comprises transmitting, to the at least one second device and from the third device, the one or more responses.

28. The non-transient computer readable medium of claim 16, wherein the method further comprises transmitting from the third device and to the at least one second device, at least one message upon termination of the session between the first device and the third device.

29. The non-transient computer readable medium of claim 16, wherein the first device includes a plurality of locking devices.

30. The non-transient computer readable medium of claim 29, wherein the method further comprises assigning one of the plurality of locking devices to the third device for operation.

* * * * *